United States Patent
Zhao et al.

(10) Patent No.: US 9,885,942 B2
(45) Date of Patent: Feb. 6, 2018

(54) ROLL AXIS ASSEMBLY AND GIMBAL PLATFORM USING SAME

(71) Applicant: SZ DJI TECHNOLOGY CO., LTD., Shenzhen (CN)

(72) Inventors: Yanchong Zhao, Shenzhen (CN); Shanguang Guo, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/581,023

(22) Filed: Apr. 28, 2017

(65) Prior Publication Data
US 2017/0227834 A1 Aug. 10, 2017

Related U.S. Application Data

(63) Continuation of application No. PCT/CN2014/090079, filed on Oct. 31, 2014.

(51) Int. Cl.
| | |
|---|---|
| *G03B 17/56* | (2006.01) |
| *F16M 11/10* | (2006.01) |
| *F16M 13/00* | (2006.01) |
| *F16M 11/18* | (2006.01) |
| *F16M 11/20* | (2006.01) |

(52) U.S. Cl.
CPC .......... *G03B 17/561* (2013.01); *F16M 11/10* (2013.01); *F16M 11/18* (2013.01); *F16M 11/2071* (2013.01); *F16M 13/00* (2013.01); *G03B 17/563* (2013.01)

(58) Field of Classification Search
None
See application file for complete search history.

(56) References Cited

U.S. PATENT DOCUMENTS

| | | | |
|---|---|---|---|
| 2014/0099092 A1 | 4/2014 | Di Leo | |
| 2016/0016674 A1* | 1/2016 | Zhao | B64D 47/08 244/118.1 |

(Continued)

FOREIGN PATENT DOCUMENTS

| | | |
|---|---|---|
| CN | 102012612 A | 4/2011 |
| CN | 202647108 U | 1/2013 |

(Continued)

OTHER PUBLICATIONS

The World Intellectual Property Organization (WIPO) International Search Report for PCT/CN2014/090079 dated Aug. 5, 2015 8 Pages.

*Primary Examiner* — W B Perkey
(74) *Attorney, Agent, or Firm* — Anova Law Group, PLLC

(57) ABSTRACT

A rotary shaft assembly includes a first supporting arm, a second supporting arm, a connecting arm connecting the first supporting arm and the second supporting arm and a driving device coupled to the second supporting arm. The driving device includes a rotor assembly and a stator assembly. The first supporting arm, the second supporting arm, and the connecting arm are integrally formed. The first supporting arm and the second supporting arm are arranged symmetrically with respect to a central point of the connecting arm. The second supporting arm comprises a connecting base arranged at an end distal from the connecting arm. The connecting base includes a receiving groove, and the rotor assembly is directly received in the receiving groove.

20 Claims, 5 Drawing Sheets

(56) References Cited

U.S. PATENT DOCUMENTS

| | | | |
|---|---|---|---|
| 2017/0094185 A1* | 3/2017 | Wang | H04N 5/23296 |
| 2017/0108761 A1* | 4/2017 | Pan | G03B 17/561 |
| 2017/0113814 A1* | 4/2017 | Zhao | B64D 47/08 |
| 2017/0115551 A1* | 4/2017 | Pan | F16F 15/28 |
| 2017/0153532 A1* | 6/2017 | Le | G03B 17/561 |
| 2017/0176840 A1* | 6/2017 | Zhou | G03B 17/561 |
| 2017/0227834 A1* | 8/2017 | Zhao | G03B 17/561 |

FOREIGN PATENT DOCUMENTS

| | | |
|---|---|---|
| CN | 103763467 A | 4/2014 |
| CN | 203666995 U | 6/2014 |
| CN | 203675190 U | 6/2014 |
| CN | 203784603 U | 8/2014 |
| CN | 104049441 A | 9/2014 |
| CN | 104068560 A | 10/2014 |
| CN | 203907156 U | 10/2014 |
| CN | 203907157 U | 10/2014 |
| CN | 203911638 U | 10/2014 |
| CN | 204387612 U | 6/2015 |
| DE | 202007005393 U1 | 9/2007 |
| JP | 2003161998 A | 6/2003 |

* cited by examiner

ROLL AXIS ASSEMBLY AND GIMBAL PLATFORM USING SAME

CROSS-REFERENCE TO RELATED APPLICATION

This is a continuation application of International Application No. PCT/CN2014/090079, filed on Oct. 31, 2014, the entire contents of which are incorporated herein by reference.

TECHNICAL FIELD

The present disclosure relates to the field of imaging apparatuses and, in particular, to a roll axis assembly and a gimbal platform using same.

BACKGROUND

A gimbal platform is a supporting worktable for mounting a camera. A lens of the camera can be adjusted by adjusting the gimbal platform to take a photo or video of a target. In existing common hand-held gimbal platforms, a roll axis arm and a motor are usually designed and manufactured separately. The roll axis arm can include a left arm, a transverse arm, and a right arm, which can be fixed by screws and then assembled with the motor. The existing gimbal platforms have the following disadvantages: 1. the amount of parts is large, and the assembly is complicated, which is disadvantageous for cost control; 2. multiple parts are fitted with each other, which requires high processing precision of the fitting faces; and 3. coaxiality of the bearing holes of the left and the right arms after assembly cannot be ensured in mass production.

SUMMARY OF THE DISCLOSURE

In accordance with the disclosure, there is provided a rotary shaft assembly including a first supporting arm, a second supporting arm, a connecting arm connecting the first supporting arm and the second supporting arm, and a driving device coupled to the second supporting arm. The driving device includes a rotor assembly and a stator assembly. The first supporting arm, the second supporting arm, and the connecting arm are integrally formed. The first supporting arm and the second supporting arm are arranged symmetrically with respect to a central point of the connecting arm. The second supporting arm comprises a connecting base arranged at an end distal from the connecting arm. The connecting base includes a receiving groove, and the rotor assembly is directly received in the receiving groove.

Also in accordance with the disclosure, there is provided a gimbal platform for carrying an imaging device. The gimbal platform includes a rotary shaft assembly including a first supporting arm, a second supporting arm, a connecting arm connecting the first supporting arm and the second supporting arm, and a driving device coupled to the second supporting arm. The driving device includes a rotor assembly and a stator assembly. The first supporting arm, the second supporting arm, and the connecting arm are integrally formed. The first supporting arm and the second supporting arm are arranged symmetrically with respect to a central point of the connecting arm. The second supporting arm comprises a connecting base arranged at an end distal from the connecting arm. The connecting base includes a receiving groove, and the rotor assembly is directly received in the receiving groove.

DETAILED DESCRIPTION OF THE EMBODIMENTS

Embodiments of the present disclosure will be described with reference to the accompanying drawings. The described embodiments are only some rather than all of the embodiments of the present disclosure. All other embodiments obtained by a person of ordinary skill in the art based on the embodiments described here without creative efforts shall fall within the scope of the present disclosure.

Figure 1:
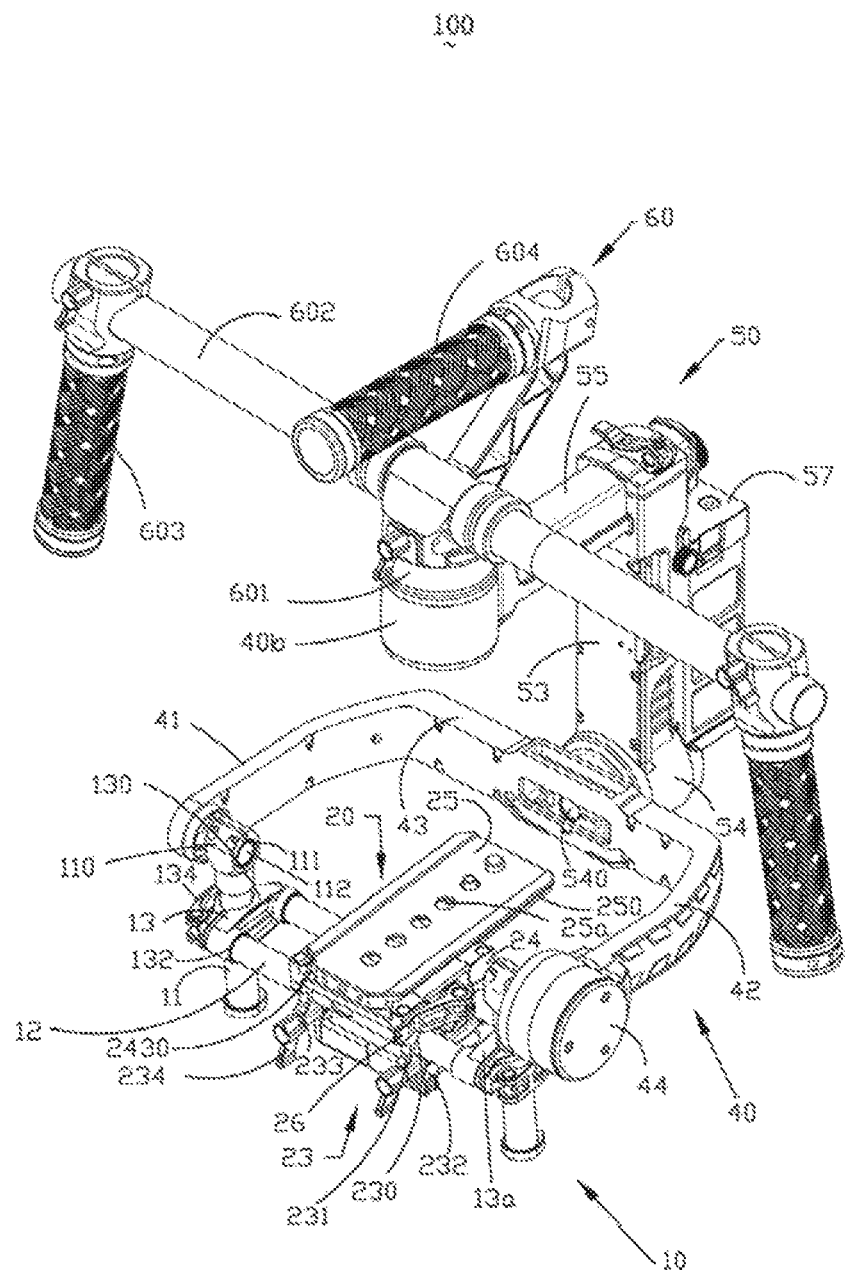
FIG. 1 is a perspective assembled schematic diagram of a gimbal platform provided by the present disclosure.
Figure 2:
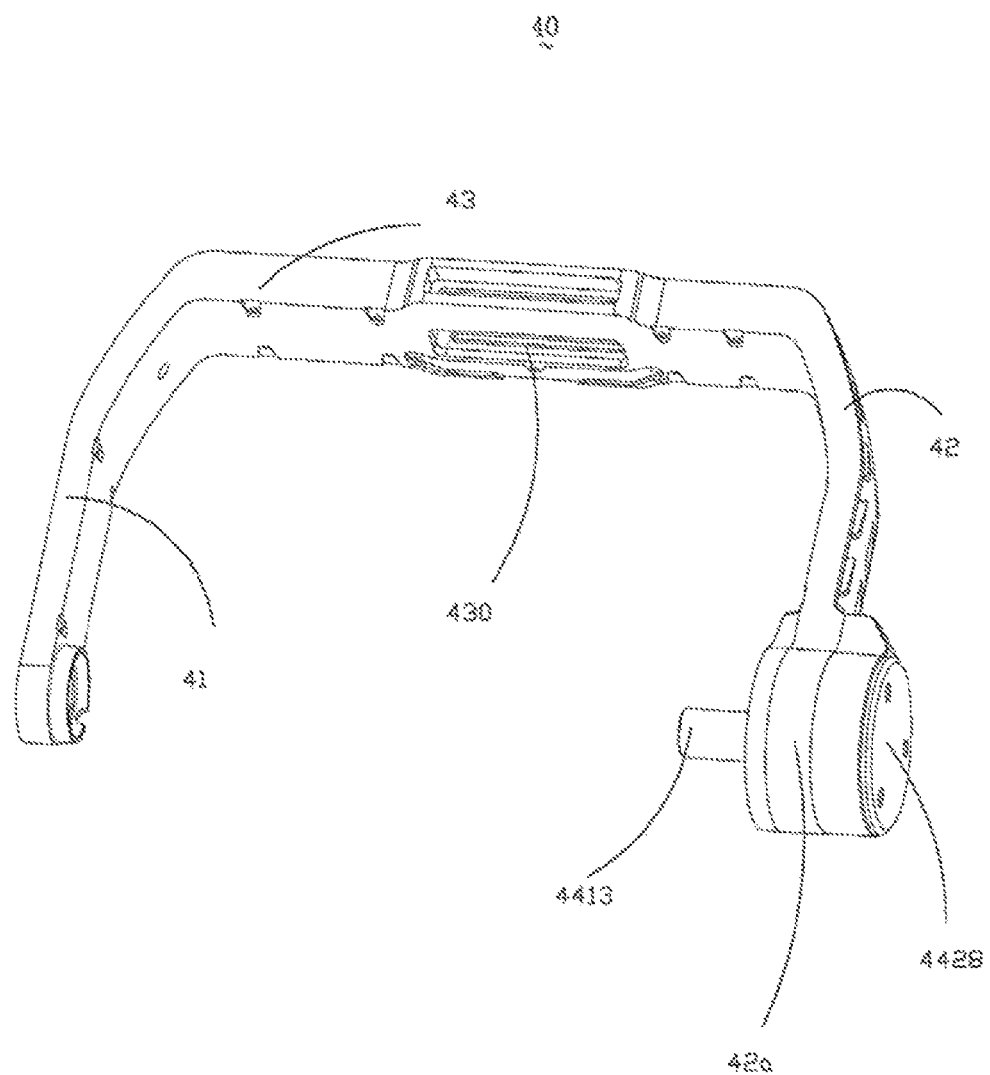
FIG. 2 is a perspective assembled schematic diagram of the roll axis assembly in FIG. 1.
Figure 3:
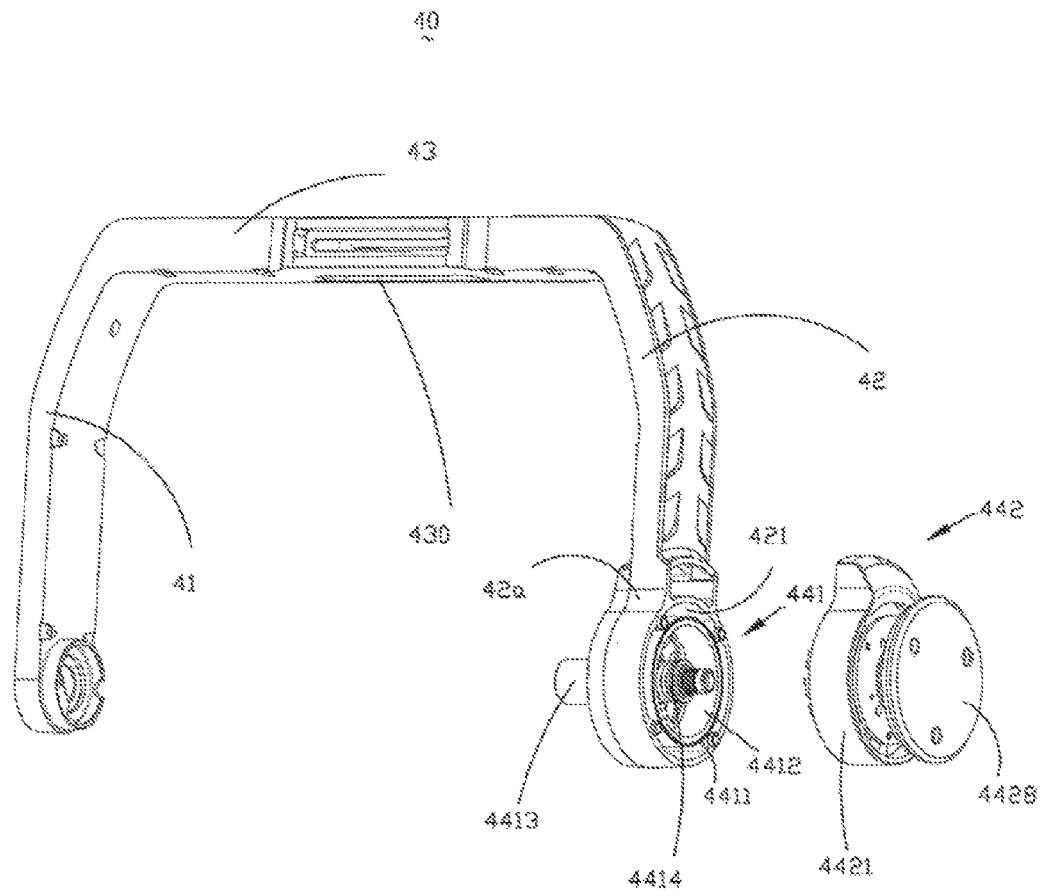
FIG. 3 is a perspective assembled schematic diagram of the roll axis assembly in FIG. 2.
Figure 4:
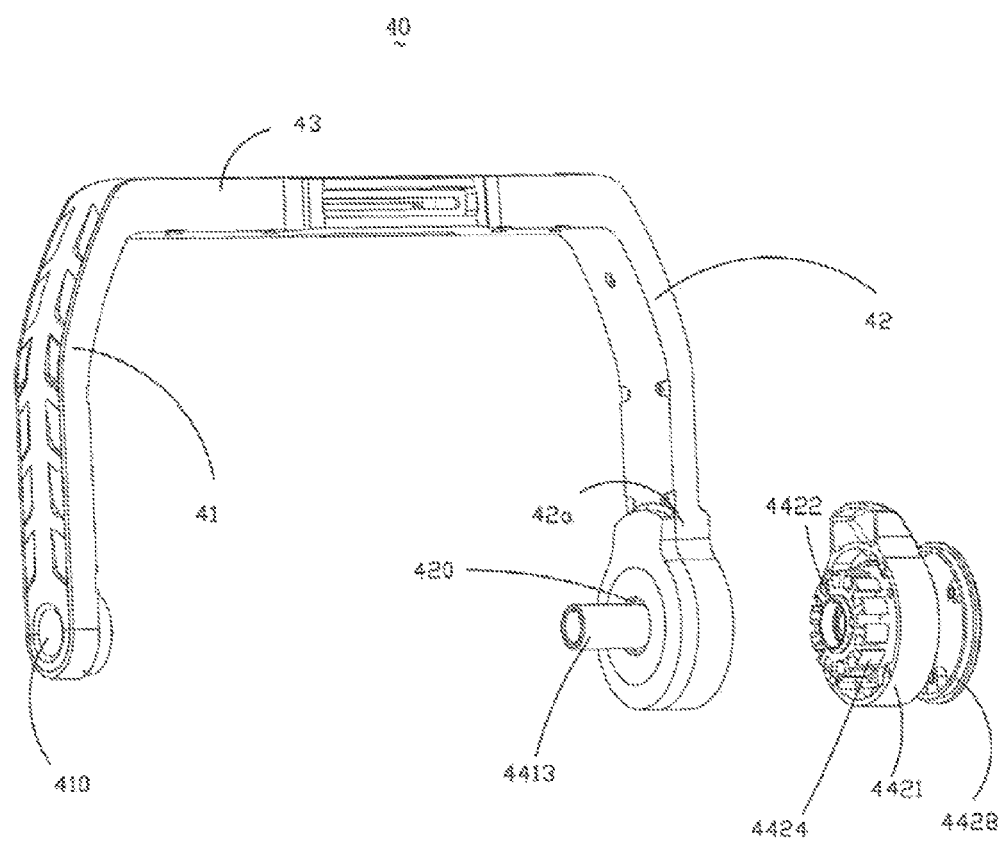
FIG. 4 is a perspective exploded schematic diagram of the roll axis assembly in FIG. 3 from another viewing angle.
Figure 5:
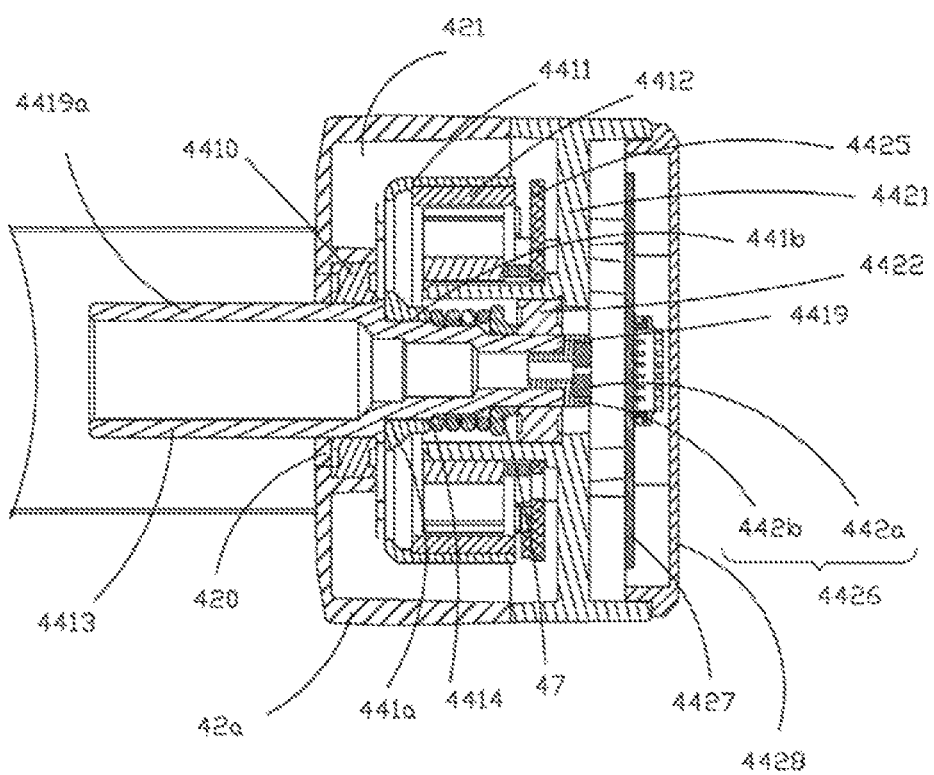
FIG. 5 is a sectional schematic diagram of the roll axis assembly in FIG. 2.

FIG. 1 shows an exemplary gimbal platform 100 for carrying an imaging device (not shown) consistent with embodiments of the disclosure. The imaging device may be a photo camera, a video camera, or a lens.

The gimbal platform 100 comprises a pitch axis assembly 10, a support assembly 20 movably arranged on the pitch axis assembly 10, a roll axis assembly 40 in pivot connection with the pitch axis assembly 10 and configured to drive the pitch axis assembly 10 to rotate, a yaw axis assembly 50 in pivot connection with the roll axis assembly 40 and configured to drive the roll axis assembly 40 to rotate, a driving part 40b configured to drive the yaw axis assembly 50 to rotate, and a holding part 60.

The pitch axis assembly 10 comprises two pillars 11, two guide posts 12, and two first position-locking devices 13. The two guide posts 12 are arranged approximately perpendicular to the two pillars 11. The two guide posts 12 can move in a lengthwise direction of the pillars 11 by means of the first position-locking devices 13, and can be fixed at any position on the pillars 11 by means of the first position-locking devices 13.

In some embodiments, the pillars 11 have a cylindrical shape. In some other embodiments, the pillars 11 can have a shape other than the cylindrical shape. As shown in FIG. 1, each of the pillars 11 comprises a connecting end 110. The connecting end 110 is provided with a through-hole 111. In some embodiments, an axial direction of the through-hole 111 is approximately perpendicular to the lengthwise direction of the pillar 11. A rotary shaft 112 is arranged in one of the through-holes 111 pillar.

In some embodiments, both of the guide posts 12 have a cylindrical shape. In some other embodiments, the guide posts 12 may have a shape other than the cylindrical shape.

The first position-locking devices 13 each comprise a collar 13a and a locking member 134. The collar 13a is provided with a fastening hole 130, and two receiving holes 132 respectively arranged at two sides of the fastening hole 130. An axial direction of the fastening hole 130 is approximately perpendicular to axial directions of the receiving holes 132. A shape and a size of the fastening hole 130 correspond to a shape and a size of the corresponding pillar 11. The two pillars 11 are sleeved in the two fastening holes 130, respectively. Each of the receiving holes 132 is configured to receive one end of one of the guide posts 12, such that the two guide posts 12 are arranged approximately parallel to each other.

The locking member 134 is configured to lock and attach the first position-locking devices 13 at any position on the corresponding pillar 11. In some embodiments, the locking member 134 includes a toggle clip made of a metal material. The locking member 134 can apply pressure to the collar 13a, so that the size of the fastening hole 130 of the collar 13a is reduced to clamp the corresponding pillar 11. In some embodiments, the mounting positions of the two guide posts 12 on the pillars 11 can be adjusted by releasing or tightening the locking members 134.

The support assembly 20 comprises two adapters 23 slidably arranged on the guide posts 12, a mounting plate 24, a supporting plate 25 slidably arranged on the mounting plate 24, and a pressing device 26. The mounting plate 24 is fixed to the adapters 23. In some embodiments, the mounting plate 24 is fixed to the adapters 23 via bolts. The supporting plate 25 arranged on the mounting plate 24. The pressing device 26 is arranged at one side of the mounting plate 24, and is configured to fix the supporting plate 25 at any position on the mounting plate 24.

To adjust the adapters 23 on the guide posts, each of the adapters 23 comprises a first pressing block 231 and a second pressing block 232 arranged oppositely. Two circular slots 230 are formed between the first pressing block 231 and the second pressing block 232, and the guide posts 12 are inserted into the circular slots 230, respectively. The first pressing block 231 and the second pressing block 232 together lock a screw 233 therein. For an adapter 23. When the screw 233 of the adapter 23 is tightly locked, the adaptor can be fixed to the guide posts 12. Similarly, when the screw 233 is released, the adapter 23 can slide on the guide posts 12 in a lengthwise direction of the guide posts 12.

In some embodiments a wrench 234 is arranged on a nut of each of the screws 233. The wrench 234 extends in a direction approximately perpendicular to a lengthwise direction of the screw 233. The wrench 234 can be turned to rotate in locking direction of the screw 233 to lock the screw 233. Similarly, the wrench 234 can be turned to rotate in a direction opposite to the looking direction of the screw 233 to release the screw 233. As such, by locking or releasing the screw 233, the adapters 23 can be fixed or be allowed to slide on the guide posts 12.

The mounting plate 24 is fixed to the second pressing blocks 232. The mounting plate 24 is provided with a first sliding groove 2430.

A plurality of screw holes 25a are uniformly arranged in a lengthwise direction of the supporting plate 25. The imaging device can be mounted on the supporting plate 25 by screws fitting in the screw holes. On the one hand, the multiple screw holes 25a allow mounting imaging devices of different specifications. On the other hand, the position of an imaging device on the supporting plate 25 can be adjusted by using different ones of the multiple screw holes 25a. In some embodiments, second sliding grooves 250 matching the first sliding grooves 2430 are arranged on two outer side walls of the supporting plate 25 corresponding to the first sliding grooves 2430. In some embodiments, each of the second sliding grooves 250 includes a dovetail sliding groove.

The pressing device 26 is configured to lock the supporting plate 25 on or release the supporting plate 25 from the mounting plate 24. As such, the supporting plate 25 can be fixed on the mounting plate 24 when locked, or slide on the mounting plate 24 when released.

FIGS. 2-5 show an example of the roll axis assembly 40 consistent with embodiments of the disclosure. The roll axis assembly 40 comprises a first supporting arm 41, a second supporting arm 42, a connecting arm 43 connecting the first supporting arm 41 and second supporting arm 42, and a first driving device 44. In some embodiments, the first supporting arm 41 and the second supporting arm 42 are arranged symmetrically, such as arranged symmetrically with respect to a central point of the connecting arm 43.

The first supporting arm 41 and the second supporting arm 42 are arranged approximately parallel to each other. The first supporting arm 41, the second supporting arm 42, and the connecting arm 43 together form an inverted U-shaped structure. The first supporting arm 41 is provided with a first bearing hole 410. The second supporting arm 420 comprises a connecting base 42a arranged at an end far away from the connecting arm 43. The connecting base 42a is provided with a second bearing hole 420 and a receiving groove 421. The second bearing hole 420 is in communication with the receiving groove 421. The second bearing hole 420 and the first bearing hole 410 are arranged oppositely and approximately coaxially. In some embodiments, to ensure the precision of the coaxiality between the second shaft hole 420 and the first bearing hole 410, reduce the number of parts of the assembly, optimize the assembly technology, reduce the rotational resistance of the first driving device 44, improve a smoothness of rotation between the first driving device 44 and the roll axis assembly 40, the first supporting arm 41, the connecting arm 43, and the second supporting arm 42 are integrally formed of, e.g., a magnesium-aluminium alloy by, e.g., die casting. One end of the rotary shaft 112 is received in the first bearing hole 410 and can rotate in the first bearing hole 410. Another end of the rotary shaft 112 is fixed in the through-hole 111 of one of the pillars 11. The connecting arm 43 is provided with a connecting hole 430.

In some embodiments, the first driving device 44 includes a brushless motor, which comprises a rotor assembly 441 and a stator assembly 442.

The rotor assembly 441 comprises a first motor bearing 4410, a rotor steel ring 4411, a magnetic ring 4412, a motor rotary shaft 4413, and a preloaded spring 4414. The first motor bearing 4410 is fixed in the second bearing hole 420. The rotor steel ring 4411 is received in the receiving groove 421, and is configured to rotate in the receiving groove 421. The rotor steel ring 4411 has a hollow cylindrical shape, with a central hole 441b provided at a center of the rotor steel ring 4411. The rotor steel ring 4411 comprises a receiving portion 441a surrounding the central hole 441b. In some embodiments, the motor rotary shaft 4413 is fixed in the central hole 441b of the rotor steel ring 4411 by adhesion. The preloaded spring 4414 is sleeved on the motor rotary shaft 4413. One end of the preloaded spring 4414 abuts against the receiving portion 441a.

The stator assembly 442 comprises a stator base 4421, a second motor bearing 4422, a stator coil base 4424, a circuit board 4425, a Hall sensor 4426, an electronic speed control board 4427, and a rear cover 4428. In some embodiments, the stator base 4421 is fixed on the connecting base 42a via bolts. The second motor bearing 4422 is fixedly connected to the stator base 4421. A fixed end 4419 of the motor rotary shaft 4413 passes through the second shaft hole 420 and the first motor bearing 4410 and is fixed in the second motor bearing 4422. A rotary end 4419a of the motor rotary shaft 4413 far away from the fixed end 4419 is fixed in the through-hole 111 of the other one of the pillars 11, i.e., in the through-hole 111 of the pillar 11 far away from the first bearing hole 410. The stator coil base 4424 is sleeved on the outer ring of the second motor bearing 4422. A plurality of coils (not shown in the figure) are arranged on the stator coil base 4424. The circuit board 4425 is arranged in the stator base 4421. The Hall sensor 4426 comprises a Hall magnet 442*a* and a Hall magnet base 442*b* for receiving the Hall magnet 442*a*. The Hall magnet base 442*b* is fixed to the fixed end 4419 of the motor rotary shaft 4413. The Hall sensor 4426 is configured to detect an angle by which the motor rotary shaft 4413 turns. That is, the Hall sensor 4426 serves as an angle sensor. The electronic speed control board 4427 is fixed in the rear cover 4428, and the electronic speed control board 4427 is configured to control a rotation speed of the first driving device 44. The rear cover 4428 is fixed to the stator base 4421.

In some embodiments, the first driving device 44 further comprises a spring pad 47. One end of the spring pad 47 abuts against the second motor bearing 4422, and the other end of the spring pad 47 abuts against the other end of the preloaded spring 4414. i.e., the end of the preloaded spring 4414 that is far away from the receiving portion 441*a*. Arranging the spring pad 47 and preloaded spring 4414 in the first driving device 44 can eliminate the clearance of the first motor bearing 4410 and the clearance of the second motor bearing 4422, so as to improve the contact rigidity of an inner ring and an outer ring of each of the two bearings, which in turn improves the rigidity of the gimbal platform 100.

In some embodiments, the spring pad 47 and preloaded spring 4414 may be omitted to save materials and reduce production costs.

In some embodiments, the first motor bearing 4410, the rotor steel ring 4411, the magnetic ring 4412, the motor rotary shaft 4413, and the preloaded spring 4414 of the rotor assembly 441 of the first driving device 44 are directly received in the connecting base 42*a* of the second supporting arm 42 of the roll axis assembly 40. This on the one hand can omit an additional rotor base for receiving the first motor bearing 4410, the rotor steel ring 4411, the magnetic ring 4412, the motor rotary shall 4413, and the preloaded spring 4414, thereby saving materials, and on the other hand can omit the step of further assembling the assembled rotor base, the first motor bearing 4410, the rotor steel ring 4411, the magnetic ring 4412, the motor rotary shaft 4413, and the preloaded spring 4414 in the connecting base 42*a* of the second supporting arm 42, thereby reducing the number of assembly steps.

The motor rotary shaft 4413 of the first driving device 44 is fixedly connected to the through-hole 111 of one of the pillars 11, and is configured to drive the pillar 11 to rotate, so as to drive the pitch axis assembly 10 to rotate. In some embodiments, the axial direction of the motor rotary shaft 4413 of the first driving device 44 is approximately perpendicular to a lengthwise direction of the second supporting arm 42. The first driving device 44 drives the pitch axis assembly 10 to rotate to adjust a shooting angle of an imaging device and can adjust a rotation speed in time to adapt to various attitudes.

In some embodiments, the first driving device 44 may be a brush electric machine or motor.

Referring again to FIG. 1, the yaw axis assembly 50 comprises a third supporting arm 53, a second driving device 54, a connecting plate 55, and a battery 57. The second driving device 54 is arranged in the third supporting arm 53. The battery 57 is arranged on the third supporting arm 53 and configured to provide electrical energy for the operation of the whole gimbal platform 100. In some embodiments, the second driving device 54 includes a brushless motor. A rotor assembly of the second driving device 54 is directly received in the third supporting arm 53 together with a stator assembly, i.e., the third supporting arm 53 directly serves as a housing for receiving the rotor assembly and the stator assembly of the second driving device 54, so as to eliminate an additional housing and save the cost.

In some other embodiments, a housing can be provided for the second driving device 54 to receive the rotor assembly and the stator assembly. During assembly, the housing can be assembled to the third supporting arm 53.

The second driving device 54 is configured to drive the roll axis assembly 40 to rotate. In some embodiments, a rotary shall 540 of the second driving device 54 is fixed in the connecting hole 430 of the connecting arm 43 and is configured to drive the roll axis assembly 40 to rotate.

An end of the third supporting arm 53 far away from the roll axis assembly 40 is connected to the connecting plate 55. The connecting plate 55 is approximately perpendicular to the third supporting arm 53, and is approximately parallel to the rotary shaft 540 of the second driving device 54.

In some embodiments, the driving part 40*b* includes a brushless motor, with the rotor assembly and stator assembly of the driving part 40*b* both directly received in the connecting plate 55. That is, the connecting plate 55 directly serves as a housing for receiving the rotor assembly and stator assembly of the driving part 40*b*, so as to eliminate an additional housing and save the cost.

In some other embodiments, a housing can be provided for the driving part 40*b* to receive the rotor assembly and the stator assembly. During assembly, the housing can be assembled to the connecting plate 55. The driving part 40*b* is configured to drive the yaw axis assembly 50 to perform 360° rotation in the horizontal direction.

The holding part 60 has a shape of a bent rod. In some embodiments, the holding part 60 comprises a connecting part 601, a supporting part 602 and a hand-held part 603. The supporting part 602 includes a rod member, and the connecting part 601 is fixedly connected to a geometrical center of the supporting part 602. The connecting part 601 is connected to the driving part 40*b*.

The hand-held part 603 comprises two cylindrical handles, and the hand-held parts 603 are fixed to two ends of the supporting part 602.

A handle 604 is fixedly arranged on the holding part 60. In some embodiments, the handle 604 is fixed to one side of the supporting part 602 and arranged opposite to the connecting part 601, such that the gimbal platform 100 can be carried when not in use. In some other embodiments, a locking mechanism can be provided to fix the holding part 60 to a ladder to mechanically and automatic move the gimbal platform 100.

In the roll axis assembly of the present disclosure, the second bearing hole is in communication with the receiving groove. Further, the first supporting arm, the connecting arm, and the second supporting arm are integrally formed, and the rotor assembly is directly received in the receiving groove. As such, the precision of the coaxiality of the second shaft hole and the first bearing hole can be ensured, the number of assembled parts can be reduced, the assembly process can be optimized, the rotary resistance of the first driving device can be reduced, and the smoothness of rotation between the first driving device and the rotary shaft assembly can be improved. Moreover, the rotor assembly is directly received in the receiving groove, and thus materials can be saved and the number of assembly steps can be reduced.

The above are merely some embodiments of the present disclosure and not intended to limit the scope of the present disclosure. Any transformation for equivalent structures or equivalent procedures made using the contents of the description and the accompanying drawings of the present disclosure or applied in other relevant technical fields directly or indirectly should likewise be similarly encompassed in the scope of the present disclosure.

What is claimed is:

1. A rotary shaft assembly, comprising:
a first supporting arm;
a second supporting arm;
a connecting arm connecting the first supporting arm and the second supporting arm; and
a driving device coupled to the second supporting arm, the driving device comprising a rotor assembly and a stator assembly,
wherein:
the first supporting arm, the second supporting arm, and the connecting arm are integrally formed,
the first supporting arm and the second supporting arm are arranged symmetrically with respect to a central point of the connecting arm,
the second supporting arm comprises a connecting base arranged at an end distal from the connecting arm, the connecting base including a receiving groove, and
the rotor assembly is directly received in the receiving groove.

2. The rotary shaft assembly of claim 1, wherein:
the first supporting arm and the second supporting arm are arranged approximately parallel to each other, and
the first supporting arm, the second supporting arm, and the connecting arm form an inverted U-shaped structure.

3. The rotary shaft assembly of claim 1, wherein the first supporting arm, the connecting arm and the second supporting arm are made of a magnesium-aluminium alloy by die casting.

4. The rotary shaft assembly of claim 1, wherein:
the first supporting arm includes a first bearing hole at an end of the first supporting arm that is distal from the connecting arm,
the connecting base further includes a second bearing hole in communication with the receiving groove, and
the second bearing hole and the first bearing hole are arranged oppositely and approximately coaxially.

5. The rotary shaft assembly of claim 4, wherein the rotor assembly comprises:
a motor bearing fixed in the second bearing hole;
a rotor steel ring received in the receiving groove and configured to rotate in the receiving groove, the rotor steel ring having a hollow cylindrical shape and including a central hole at a center of the rotor steel ring; and
a motor rotary shaft fixed in the central hole.

6. The rotary shaft assembly of claim 5, wherein the motor rotary shaft is fixed in the central hole by adhesion.

7. The rotary shaft assembly of claim 5, wherein:
the motor bearing is a first motor bearing, and
the stator assembly comprises:
a stator base fixed on the connecting base;
a second motor bearing fixed in the stator base, a fixed end of the motor rotary shaft passing through the second bearing hole and the first motor bearing and being fixed in the second motor bearing;
a stator coil base sleeved on an outer ring of the second motor bearing, a plurality of coils being arranged on the stator coil base;
a circuit board arranged in the stator base;
a Hall sensor fixed to the fixed end and configured to detect an angle by which the motor rotary shaft rotates;
a rear cover fixed to the stator base; and
an electronic speed control board fixed in the rear cover.

8. The rotary shaft assembly of claim 7, wherein the Hall sensor comprises a Hall magnet and a Hall magnet base, the Hall magnet base being configured to receive the Hall magnet and being fixed to the fixed end.

9. The rotary shaft assembly of claim 7, wherein:
the rotor assembly further comprises a preloaded spring sleeved on the motor rotary shaft, and
the first driving device further comprises a spring pad, one end of the spring pad abutting against the second motor bearing, and the other end of the spring pad abutting against an end of the preloaded spring that is distal from a receiving portion of the rotor steel ring.

10. A gimbal platform for carrying an imaging device, comprising:
a rotary shaft assembly comprising:
a first supporting arm;
a second supporting arm;
a connecting arm connecting the first supporting arm and the second supporting arm; and
a driving device coupled to the second supporting arm, the driving device comprising a rotor assembly and a stator assembly,
wherein:
the first supporting arm, the second supporting arm, and the connecting arm are integrally formed,
the first supporting arm and the second supporting arm are arranged symmetrically with respect to a central point of the connecting arm,
the second supporting arm comprises a connecting base arranged at an end distal from the connecting arm, the connecting base including a receiving groove, and
the rotor assembly is directly received in the receiving groove.

11. The gimbal platform of claim 10, wherein:
the first supporting arm and the second supporting arm are arranged approximately parallel to each other, and
the first supporting arm, the second supporting arm, and the connecting arm form an inverted U-shaped structure.

12. The gimbal platform of claim 10, wherein the first supporting arm, the connecting arm, and the second supporting arm are made of a magnesium-aluminium alloy by die casting.

13. The gimbal platform of claim 10, wherein:
the first supporting arm includes a first bearing hole at an end of the first supporting arm that is distal from the connecting arm,
the connecting base further includes a second bearing hole in communication with the receiving groove, and
the second bearing hole and the first bearing hole are arranged oppositely and coaxially.

14. The gimbal platform of claim 10, wherein the rotor assembly comprises:
a motor bearing fixed in the second bearing hole;
a rotor steel ring received in the receiving groove and configured to rotate in the receiving groove, the rotor steel ring having a hollow cylindrical shape and including a central hole at a center of the rotor steel ring; and
a motor rotary shaft fixed in the central hole.

15. The gimbal platform of claim 14, wherein the motor rotary shaft is fixed in the central hole by adhesion.

16. The gimbal platform of claim 14, wherein:
the motor bearing is a first motor bearing, and
the stator assembly comprises:
a stator base fixed on the connecting base;
a second motor bearing fixed in the stator base, a fixed end of the motor rotary shaft passing through the second bearing hole and the first motor bearing and being fixed in the second motor bearing;
a stator coil base sleeved on an outer ring of the second motor bearing, a plurality of coils being arranged on the stator coil base;
a circuit board arranged in the stator base;
a Hall sensor fixed to the fixed end and configured to detect an angle by which the motor rotary shaft rotates;
a rear cover fixed to the stator base; and
an electronic speed control board fixed in the rear cover.

17. The gimbal platform of claim 16, wherein the Hall sensor comprises a Hall magnet and a Hall magnet base, the Hall magnet base being configured to receive the Hall magnet and being fixed to the fixed end.

18. The gimbal platform of claim 16, wherein:
the rotor assembly further comprises a preloaded spring sleeved on the motor rotary shaft, and
the first driving device further comprises a spring pad, one end of the spring pad abutting against the second motor bearing, and the other end of the spring pad abutting against an end of the preloaded spring that is distal from a receiving portion of the rotor steel ring.

19. The gimbal platform of claim 10, wherein:
the rotary shaft assembly is a roll axis assembly of the gimbal platform,
the gimbal platform further comprising:
pitch axis assembly in pivot connection with the roll axis assembly;
a yaw axis assembly in pivot connection with the roll axis assembly; and
a support assembly movably arranged on the pitch axis assembly and configured to support the imaging device.

20. The gimbal platform of claim 19, wherein the pitch axis assembly comprises two pillars, two guide posts, and two position-locking devices coupling the two guide posts to the two pillars, the two guide posts being approximately perpendicular to the two pillars and being configured to move in a longitudinal direction of the pillars.

* * * * *